United States Patent Office 3,156,178
Patented Nov. 10, 1964

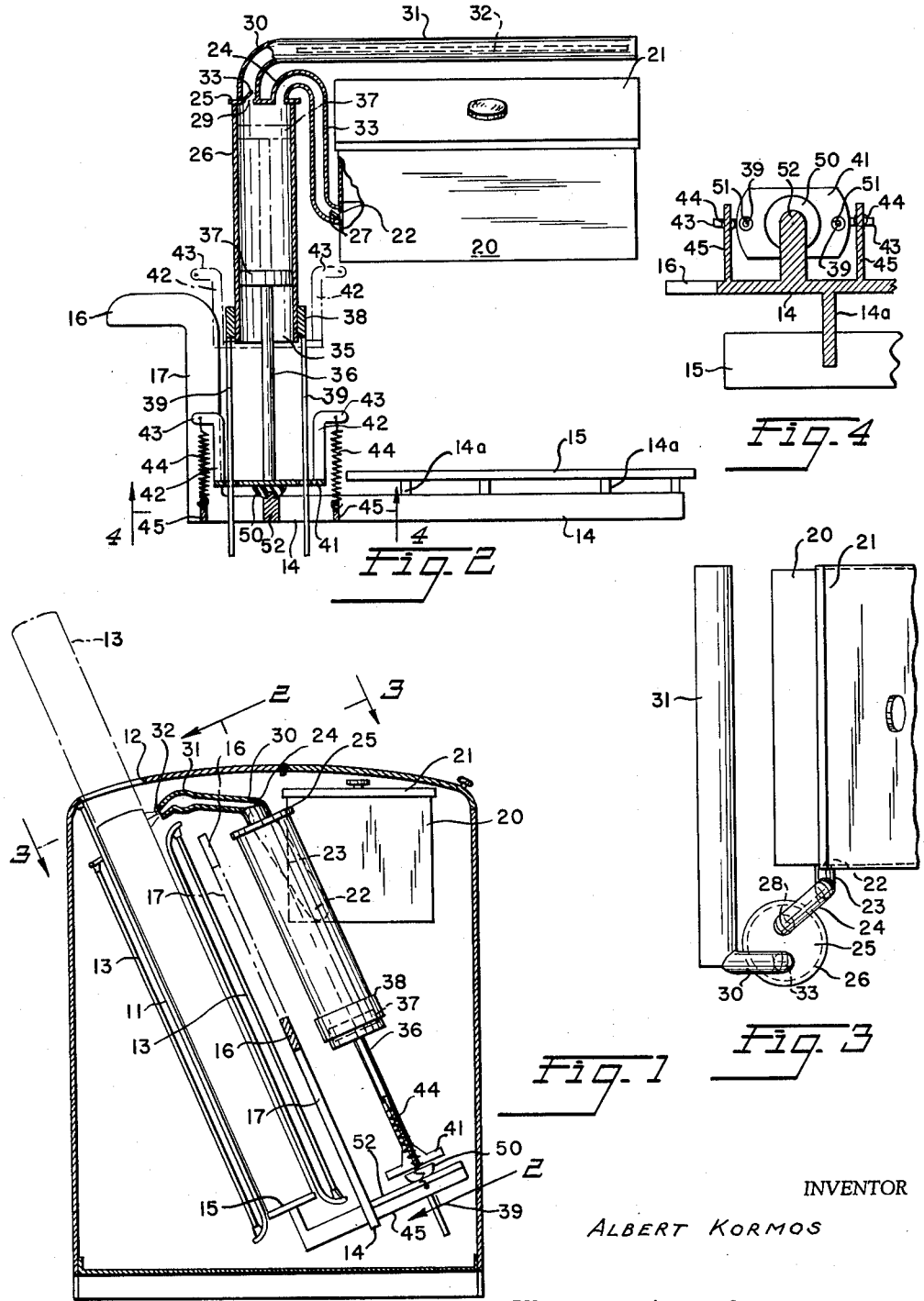

3,156,178
POP-UP TOASTER HAVING MEANS FOR BUTTERING TOAST DURING THE EJECTION THEREOF
Albert A. Kormos, 689 East 400 South, Provo, Utah
Filed May 14, 1963, Ser. No. 280,322
4 Claims. (Cl. 99—355)

This invention relates to an apparatus for buttering toast, and more particularly to such an apparatus adapted to be used in conjunction with a pop-up type toaster which will automatically butter a slice of toast after completion of the toasting, and as the toast is ejected from the toaster.

An additional object of this invention is the provision of a device of this character including a reservoir for butter or the like, and a piston which is automatically actuated by the pop-up action of the toaster evenly to diffuse butter over the surface of the piece of toast after the toasting is completed.

A further object of the invention is the provision of a device of this character which includes means to compensate for the solidification of butter when cold, until such time as the butter is liquified by the action of the toaster.

A further object of the invention is the provision of a device of this character which will evenly diffuse butter over the entire surface of one side of the toast.

An additional object of the invention is the provision of a device of this character which is sturdy and durable in construction, reliable and efficient in operation, and relatively inexpensive to manufacture, utilize and operate.

Still other objects reside in the combinations of elements, arrangements of parts, and features of construction, all as will be more fully pointed out hereinafter and disclosed in the accompanying drawing wherein there is shown a preferred embodiment of this inventive concept.

In the drawing:

FIGURE 1 is an end view, partially in elevation and partially in section disclosing one form of toast buttering device incorporating this inventive concept.

FIG. 2 is a side elevational view partially in section and partially in elevation disclosing the positioning of the attachment relative to the pop-up mechanism of the toaster, other elements of the toaster being omitted for the sake of clarity.

FIG. 3 is a top plan view of the apparatus of FIG. 2, with the toaster omitted, and, FIG. 4 is a sectional view taken substantially along the line 4—4 of FIG. 2, as viewed in the direction indicated by the arrows.

Similar reference characters refer to similar parts throughout the several views of the drawing.

Having reference now to the drawings in detail, there is generally indicated at 10 an electric toaster of the pop-up type, which includes an angularly disposed slot 11 having a top opening 12 in which a slice of bread B is adapted to be inserted for toasting. The usual heating elements are schematically indicated at 13, while a pop-up support plate 14 connected by lugs 14a to a toast support 15 is provided with the conventional handle 16 extending from a support 17, the arrangement being such that as the handle 16 is depressed support 15 is similarly depressed and retained interiorly of the toaster until the toasting of the bread is completed. Any desired type of mechanism may be employed for this purpose, and such mechanism is largely conventional except for the inclination of the toasting slot 11.

The toasting apparatus comprising the instant invention includes a rectangular tank or receptacle 20 having a removable top 21, through which butter may be inserted into the tank. The lower portion of the tank has an opening 22 which communicates with a pipe 23, which latter curves downwardly as at 24 and opens into the top 25 of a piston cylinder 26. A one-way check valve 27 provided at the opening 22, permits the flow of liquified butter from tank or receptacle 20 into the cylinder 26, but precludes return flow.

A second opening 29 in the top 25 of cylinder 26 communicates with a pipe 30, which extends into a horizontal reservoir 31, which extends transversely across the top of the toaster immediately adjacent the top of the toasting receptacle 11, or the top T of the piece of bread after it has been inserted into the toaster. The reservoir 31 is provided with a longitudinally extending opening or slit 32 extending the full width thereof, and so arranged that when the reservoir 31 is filled with fluid butter or the like and ejected, in a manner to be more fully described hereinafter, butter is diffused along the entire width of the piece of toast. A one-way check valve 33 at the entrance to pipe 30 permits liquid butter to flow from the cylinder 26 but not return thereto.

The lower end of cylinder 26 is open as at 35, to permit the passage of a piston rod 36, the upper end of which carries a piston 37 interiorly of the cylinder 26.

Two guide rods 39 are linearly fixed to the exterior of cylinder 26.

The lower end of piston rod 36 is secured to a transverse plate 41 which is provided with openings 51 through which the rods 38 extend, to maintain plate 41 in alignment, and which carries at each end an upright 42 with an offset upper end portion 43, to each of which is connected one end of a coil spring 44. The opposite ends of springs 44 are connected to supports 45 which are fixedly secured to the pop-up plate 14. A lug 52 extends from plate 14 and carries a rubber cushion 50 which serves as a stop and buffer for plate 41.

The arrangement is thus such that when the device is initially started in operation, solid butter is positioned in the tank 20, and heated by the toaster, until it liquifies. During the initial operation of the device the handle 16 may be moved upwardly at the end of this operation and then returned to its down position, at which time the piston 37 will create a suction in cylinder 26 to draw butter from receptacle 20 through pipe 23 into the cylinder. Assuming that a piece of toast is then placed in the toaster after this initial operation, when the toasting is finished the upward movement of the support plate 14 will simultaneously force the piston 37 upwardly to eject liquid butter through the valve 33 into the reservoir 31 and thence outwardly through slot 32 to be diffused evenly over the toast as the toast rises on the support 15. After the initial use of the device, the reservoir 31 and the upper portion of cylinder 26 are filled with liquid butter, which, upon solidification, tends to hold the piston 37 in its uppermost position, as indicated by dotted lines in FIG. 2.

When the toaster cools, the butter solidifies and serves to hold the piston 37 in its uppermost position.

When it is again desired to use the toaster, a piece of bread is inserted through the opening 12, and the handle 16 forced downwardly, which turns the toaster into its "On" position. At this time the springs 44 yield and permit piston 37 to be retained by its adherence to the solidified butter in its uppermost position. As the butter liquifies from the heat of the toaster, piston 37 is drawn downwardly by springs 44, and the suction thus created draws additional liquid butter from the receptacle 20. Then, when the toasting operation is completed and plate 14 pops upwardly, the piston is simultaneously moved upwardly to eject additional liquid butter into the reservoir 31 and out through the slot 32 evenly and completely to butter the adjacent side of the toast.

The entire apparatus is so arranged that it may be readily removed for cleaning or other purposes as desired.

From the foregoing it will now be seen that there is herein provided an improved apparatus for buttering toast in conjunction with a pop-up toaster which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. In combination with a toaster of the pop-up type including a body having a slot therein for the reception of a piece of bread to be toasted, heating elements for toasting the bread adjacent said slot, a support for the bread, and a handle member depressible to lower said support and automatically movable to raise the support when the toasting is completed; a buttering device for the toasted bread comprising a receptacle for butter, a cylinder, a tube extending between said receptacle and the top of said cylinder, a reservoir extending parallel to said slot adjacent the top of said body and having an elongated opening therein on the side adjacent a tube connecting the top of said cylinder to said reservoir, a piston in said cylinder, and a piston rod extending between said piston and said support actuable upon raising of the support to eject fluid butter heated by said heating elements through said opening onto the adjacent side of the toasted bread.

2. The structure of claim 1 wherein a one-way check valve is positioned in the tube connecting the receptacle and the cylinder permitting flow from the receptacle to the cylinder, and a second one-way check valve is positioned in the tube extending between the cylinder and the reservoir permitting flow from the cylinder to the reservoir.

3. The structure of claim 2 wherein a resilient connection is provided between said piston and said support permitting the support to be lowered when the piston is held in raised position by solidified butter, but biasing said piston downwardly when the butter is melted by said heating elements.

4. The structure of claim 3 wherein said resilient connection comprises a support plate having openings therein connected to said piston rod, guide rods secured to said cylinder and extending through said openings, arms carried by said plate, and tension springs connected between said arms and said support.

References Cited in the file of this patent

UNITED STATES PATENTS

| | | |
|---|---|---|
| 1,633,391 | Beskin | June 21, 1927 |
| 2,014,595 | Simmons | Sept. 17, 1935 |
| 2,027,002 | Spang | Jan. 7, 1936 |
| 2,109,796 | Hirschenfeld | Mar. 1, 1938 |